United States Patent [19]

Mabuchi et al.

[11] 3,980,940
[45] Sept. 14, 1976

[54] BATTERY EQUALIZING SYSTEM

[75] Inventors: Kenichi Mabuchi; Kogiro Komatsu, both of Tokyo, Japan

[73] Assignee: Mabuchi Motor Co. Ltd., Tokyo, Japan

[22] Filed: Apr. 8, 1974

[21] Appl. No.: 458,875

[30] Foreign Application Priority Data
Apr. 10, 1973  Japan.............................. 48-40685
Apr. 10, 1973  Japan.............................. 48-40686

[52] U.S. Cl................................... 320/2; 320/13
[51] Int. Cl.²................................ H02J 7/00
[58] Field of Search............. 320/13, 18, 53, 57, 320/43, 40, 2

[56] References Cited
UNITED STATES PATENTS

| | | | |
|---|---|---|---|
| 2,624,033 | 12/1952 | Jacquier........................ | 320/18 UX |
| 2,904,739 | 9/1959 | Reed, Jr........................ | 320/7 |
| 3,148,322 | 9/1964 | Booe et al..................... | 320/43 |
| 3,202,900 | 8/1965 | McGivern, Jr.................. | 320/53 X |
| 3,343,058 | 9/1967 | Deschamps et al.............. | 320/40 X |
| 3,418,450 | 12/1968 | Schott.......................... | 320/2 X |
| 3,454,859 | 7/1969 | Ford et al...................... | 320/13 X |
| 3,496,703 | 2/1970 | MacLeod et al................. | 320/2 X |
| 3,534,354 | 10/1970 | Galginaitis..................... | 320/48 X |
| 3,644,873 | 2/1972 | Dalton et al.................... | 320/2 X |

*Primary Examiner*—J D Miller
*Assistant Examiner*—Robert J. Hickey

[57] ABSTRACT

In reference to a chargeable battery of the type which can be charged rapidly and afford big discharge current when in use, a battery equalizing system is disclosed for equally charging each component cell of the battery to avoid inverse charging and deterioration due to it.

1 Claim, 12 Drawing Figures

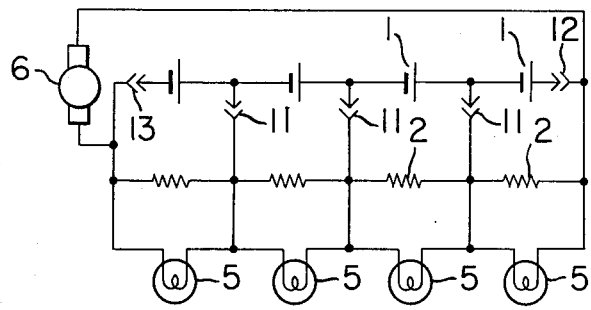
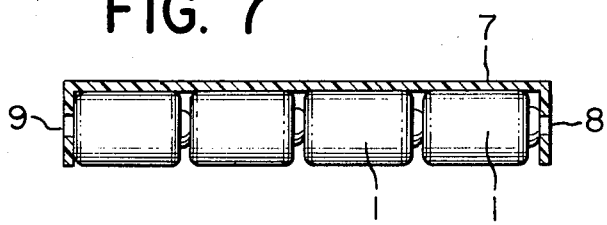
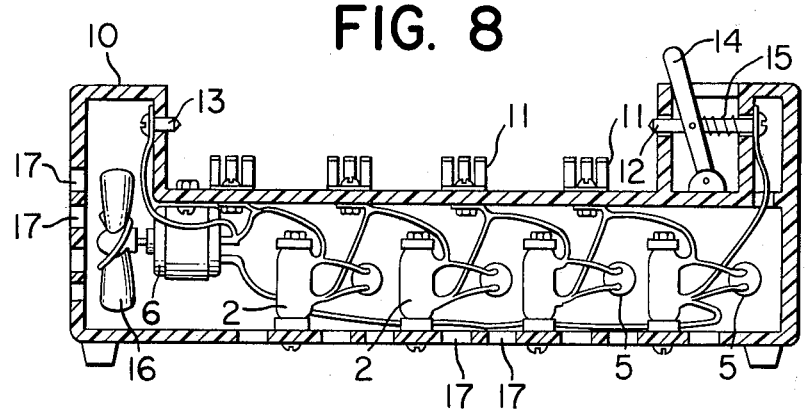
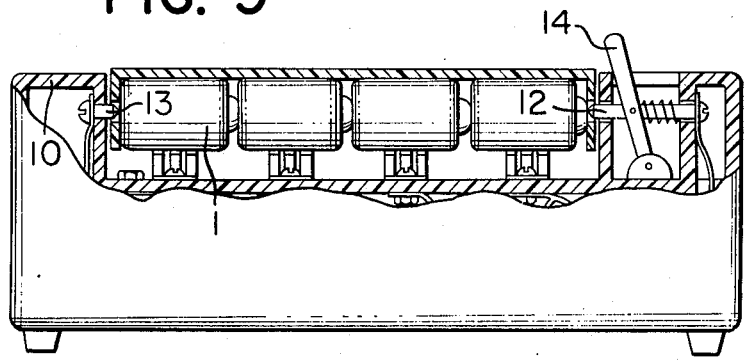

BATTERY EQUALIZING SYSTEM

BACKGROUND OF THE INVENTION

1. Field of the Invention

This invention relates to battery equalizing systems for chargeable batteries and, more particularly, it relates to battery equalizing systems adapted to be used with chargeable batteries of the type which can be charged rapidly and can afford a big discharge current when in use, including a system which equalizes the charging of each component cell of the battery during charging, as well as a system which, prior to charging, permits each cell to discharge so as to have the same residual charge left at the start of charging.

2. Description of the Prior Art

Recently there have been developed nickel-cadmium type cells and among them a nickel-cadmium cell with a relief valve for releasing internal gas in the event of overcharging. Such a cell has so low an internal resistance as to afford big discharge current (several amperes or more) and can be charged very rapidly (in a few or more minutes) when exhausted. For this reason, such cells are now being used as electric power sources for electrically driven toys such as electrically driven model airplanes as well as other various electric appliances.

In case of a battery assembly, however, which is composed of a plurality of such cells, and particularly in case the battery is used with repeated rapid charging and big-current discharging for a short period of time, it often happens that inverse charging may occur in some of the cells of the battery due to the slight difference in capacity or other characteristics among the individual cells and this often leads to a considerable shortening of the life of the battery as a whole.

The present invention is proposed to solve this problem and has for its object the equalization of the charging voltage across each component cell during charging as well as the avoidance of over charging of it. The charging equalizer circuit given in accordance with the invention may either be connected to the battery only at the time of charging or may normally be connected thereto in parallel in order to prevent any overcharging by mistake.

In one embodiment of the invention, a charge equalizing circuit is connected in parallel to each of the cells connected in series constituting the battery to equalize the amount of charging of each cell, while in another embodiment, a discharge equalizing circuit is connected in parallel to each of the cells connected in series so that, prior to charging, each cell may be discharged to a zero residual charge whereby to equalize the amount of the subsequent charging of each cell.

SUMMARY OF THE INVENTION

It is an object of the invention to provide a battery equalizing system for equally charging each of the chargeable cells connected in series.

It is another object of the invention to provide a battery equalizing system with discharge circuits connected normally to the cells.

It is another object of the invention to provide a battery equalizing system having discharge circuits to be connected only at the time of charging.

It is another object of the invention to provide a battery equalizing system using silicon diodes or the like as the elements of the discharge circuits to be connected to the chargeable cells.

It is another object of the invention to provide a battery equalizing system for chargeable batteries in which discharge circuits are connected in parallel to the chargeable cells to let them discharge an equal residual charge before the charging is started.

It is another object of the invention to provide a battery equalizing system for chargeable batteries using pilot lamps to indicate the residual charge.

It is another object of the invention to provide a discharger in which a fan used as a discharge load is also used as a heat remover.

It is a further object of the invention to provide a discharger having a cassette which holds a set of cells to be used in series connection.

It is still a further object of the invention to provide a discharger which has a separate cassette holding the cells and a separate discharger housing containing the discharge circuits.

BRIEF DESCRIPTION OF THE DRAWING

FIGS. 6 to 9 show a discharge equalizer embodying the battery equalizing system, wherein FIG. 6 shows its electrical connections, FIG. 7 shows an example of the cassette case holding the battery cells, FIG. 8 is a cross-section of an embodiment of the discharge equalizer, and FIG. 9 shows the battery cassette case as mounted on the discharge equalizer.

DETAILED DESCRIPTION OF THE EMBODIMENT

In a chargeable battery device consisting of two or more cells connected in series, if there are some differences in quality or characteristics among the individual cells, the performance of the battery as a whole will be limited by the cell that has the poorest performance of all the cells constituting the battery. Therefore, cells having equal performance or characteristics should be chosen and assembled to compose a chargeable battery. With recently developed nickel-cadmium cells, especially equipped with a relief valve for discharging internal gases in case of overcharging, it is possible to repeat complete discharging (to zero terminal voltage) and rapid charging (in a few or more minutes) over hundreds or thousands of times. As a result of such repeated charging and discharging, even a slight difference in performance or characteristics among the individual component cells may be compounded to such an extent as to cause overcharging or inverse charging phenomena in some of the cells. Consequently, the overall performance of the battery as a whole will be less than the expected sum of the performances of the component cells and the life of the battery may often be shortened. Such phenomenon becomes more probable when the charge or discharge current is big compared with the capacity of the cells and when the number of component cells is increased.

FIG. 1 is presented to explain the inverse charging phenomenon mentioned above. Referring to FIG. 1

(A), let it be assumed that the cells 1W to 1Z have been charged to 1.2V each and are now to discharge through a load $R_L$. If the four cells have just the same characteristics and have retained just the same amount of charge, each of the cells will equally discharge with time until all the charge is dissipated leaving the terminal voltage across each cell zero. However, if one cell 1Y, for example, has a different characteristic from the other, only that cell will come to present a voltage of opposite polarity to the ordinary voltage, as shown in FIG. 1 (C). This phenomenon is called inverse charging, which would rapidly deteriorate the quality of that particular cell and spoil its performance as a cell in a short time.

With reference to such inverse charging, each component cell in itself may be regarded as equivalent to an electromotive force e with a parallel resistance $R_p$ and a series $R_s$, as shown in FIG. 1 (D). The cell 1Y may be regarded as having a smaller value of $R_p$ and hence a larger self-discharge therethrough leaving a smaller quantity of charge retained in that cell. Thus, it is considered that, during the use of the cells as a battery, the cell 1Y will be discharged (i.e., its electromotive force e becomes zero) earlier than the other cells, so that a voltage of opposite polarity will appear across the resistances $R_p$, $R_s$ in the cell 1Y as a voltage drop due to the discharge current therethrough flowing from the other sound cells.

Figure 1A:
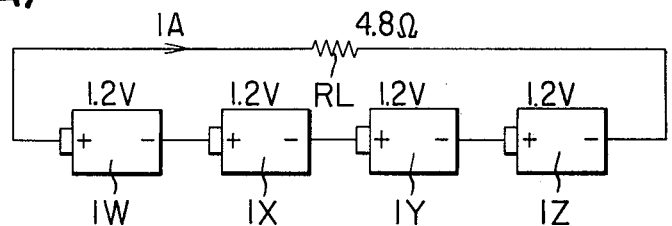
FIGS. 1 (A) to (D) are diagrams for explaining the inverse charging phenomenon.
Figure 1B:
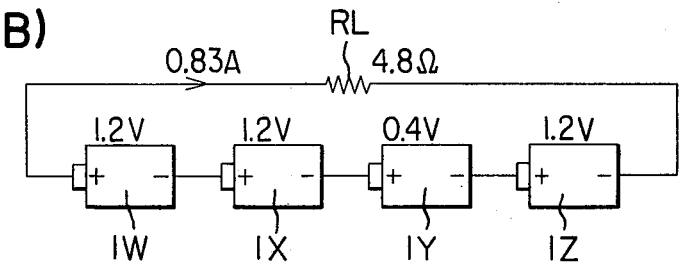
Figure 1C:
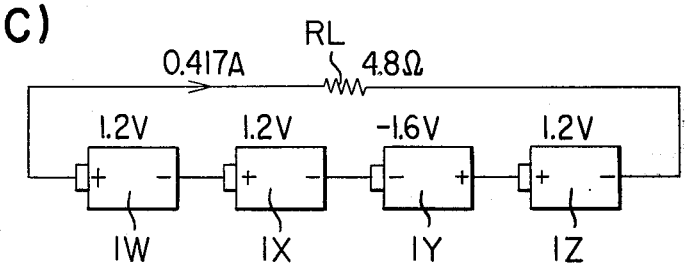
Figure 1D:
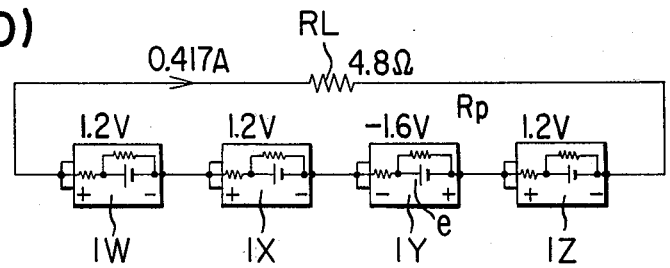

In the case of FIG. 1(B), where discharge has been stopped at the state shown without going to the inverse charging as above and now charging is to start to provide for the next use, supply of a given charging current will cause the sound cells 1W, 1X and 1Z to be fully charged before the completion of charging of the cell 1Y. If the next discharge starts with that condition, the cell 1Y will complete its discharge earlier than the other cells and, if discharging keeps on further, the cell 1Y will come to have the opposite polarity and receive what is called inverse charging. On the other hand, if the charging is continued till the cell 1Y becomes fully charged, the other component cells 1W, 1X and 1Z will be overcharged and generate heat with the result of deterioration in their characteristics. Such unbalance among the cells, however slight it may be at first, will compound as the charge and discharge cycle is repeated, until at least inverse charging or over-charging will take place.

Figure 2:
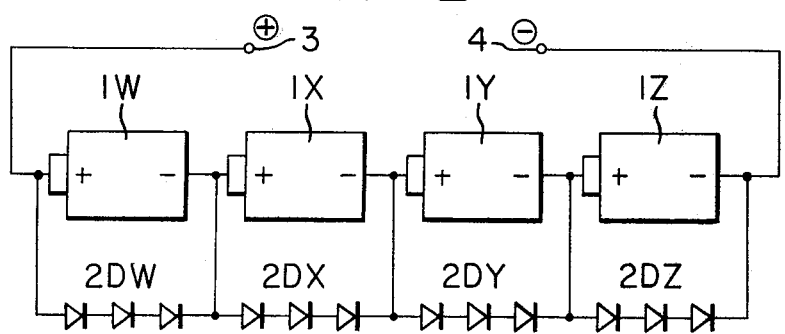
FIG. 2 shows a circuit, when charging, embodying the battery equalizing system in accordance with the invention.

In FIG. 2, which shows an embodiment of the invention, each component cell has connected in parallel thereto a discharge circuit which turns conductive when the voltage across each cell exceeds a predetermined value. Thus, the component cells 1X to 1Z are provided with discharge circuits 2DW to 2DZ connected in parallel thereto, respectively, each consisting of three silicon diodes, for example, connected in series in order to use their forward voltage-current characteristics.

Figure 3:
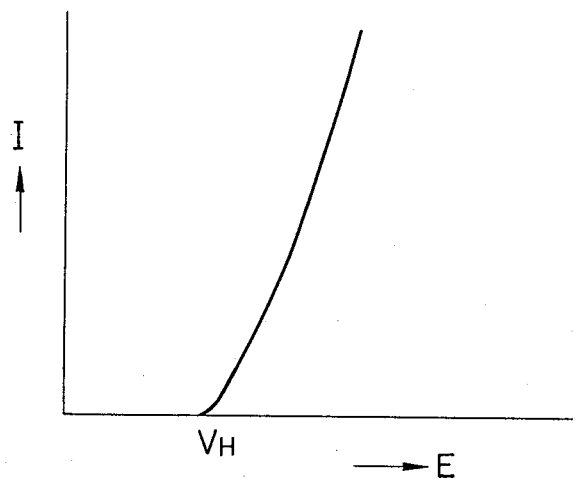
FIG. 3 shows the forward voltage-current characteristics of a semi-conductor diode.

As shown in FIG. 3, the semiconductor element such as a germanium diode or a silicon diode has the characteristics in the forward direction that hardly any current flows within a voltage range below a certain low value $V_H$, but when a voltage exceeding that value $V_H$ is applied a big forward current flows. A test was conducted with four Nickel-Cadmium cells, for example, type ⅓ AA, nominal capacity 100 mAH, connected in series, used as the cells 1X to 1Z. A constant-current charging operation at 0.2 A was started with an initial terminal voltage of 1.25 V across each cell. The terminal voltage became 1.35V after about 3 minutes, further increased with time, and reached 1.45V in about 22 minutes. Thereafter the terminal voltage increased rapidly, becoming 1.5V after 26 minutes, 1.58 V after 27 minutes, and finally a peak voltage of 1.65 V was reached after 30 minutes, when overcharge took place. From this it is understood that a satisfactory fully charged condition may be obtained if charging is stopped at a point where the terminal voltage is 1.55 V.

Thus, the preferred discharge circuits 2DW to 2DZ using such a diode forward characteristics as shown in FIG. 3, are made of three silicon diodes with the $V_H$ voltage of about 0.51V and are connected in parallel to cells 1W to 1Z each. With such arrangement, charging the battery from terminals 3 and 4 makes the voltage across each component cell increase gradually and, when it reaches 1.53V (i.e. 3 × 0.51V), each discharge circuits 2DW to 2DZ starts discharging. In other words, the voltage across each cell is limited to 1.53V and never causes overcharging. Consequently, even if e.g. the cell 1Y had a very low terminal voltage before charging starts, the voltage across each of the other cells 1W, 1X and 1Z is kept from increasing further after it has reached 1.53V, so that the cell 1Y, not yet fully charged, may be given sufficient voltage to complete its charging. In the conventional charging operation without the discharge circuits, those cells which had reached the fully charged condition earlier, would be overcharged and the voltage across them would become unnecessarily high, while the voltage across the cells which had not yet been fully charged would tend to become accordingly lower. Thus the prior art has the disadvantage that waiting for the cell 1Y to become fully charged causes overcharing of the other cells. In contrast with this, the present invention makes it possible to bring all the cells into fully charged condition while preventing overcharging, for the accumulation of any unbalance among the cells in the course of repeated charge and discharge operations can be eliminated, according to the invention, by equalizing the quantity of charge in every cell during charging and therefore hardly any inverse charging as explained in reference to FIG. 1 can take place.

Though, in the above-mentioned embodiment, silicon diodes are used for the discharge circuits, it is needless to say that other semi-conductor diodes such as germanium diodes or other non-linear resistance elements or combinations thereof may also be used. The number of the diodes may be chosen to meet the full-charge voltage as desired.

While the discharge circuits in FIG. 2 have been described as being normally connected in parallel with the cells, a charger equipped with such discharge circuits may be connected to the cells only at the time of charging.

Figure 4:
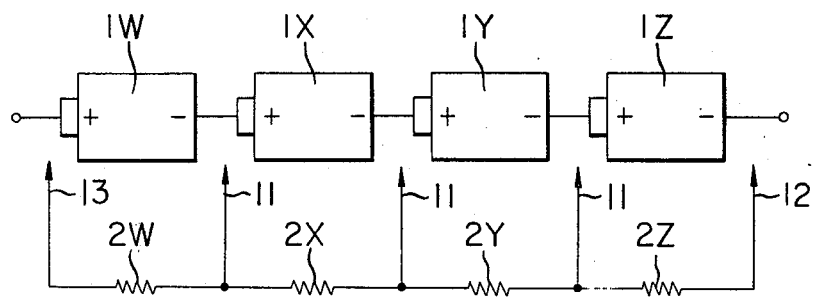
FIG. 4 and FIG. 5 show further circuits embodying the invention.

In the embodiments shown in FIGS. 4 to 9, resistors or other discharge circuits are connected, prior to charging, with the series-connected cells, whereby each of the cells may discharge to the same level of voltage even though there has been some difference in residual charge among them. The equalization of the voltage across each cell to the same level prior to charging permits the cells to be equally charged in the subsequent charging so that they will have equal amount of charge without causing overcharging. It also serves to prevent an extreme unbalance from occurring in the subsequent discharge as shown in FIG. 1 (B). Of course, deterioration of the cells may be prevented by making such discharge equalizing operation as shown in FIG. 4 at every discharge or every few discharges, though in the latter case some unbalance may follow because of possible slight difference in their characteristics.

Figure 5:
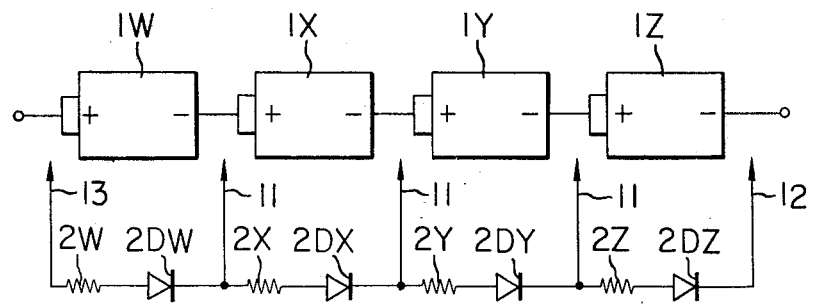

FIG. 4 shows an embodiment in which the discharge equalization is carried out by means of resistors 2W to 2Z, whereas FIG. 5 shows another embodiment in which the discharge equalization is carried out using the forward characteristics of silicon diodes 2DW to 2DZ, for example.

The forward characteristics of the silicon diode or germanium diode is such that almost no current flows and the discharge is substantially disabled when the forward voltage is less than 0.5 – 0.7V, for silicon, and 0.3V, for germanium.

With such a silicon diode of equal quality connected in parallel to each cell, as shown in the embodiment of FIG. 5, each cell will discharge through its diode, but after its voltage has come down to a level of about 0.5 – 0.7 V, it will not discharge any longer. Thus, every cell is equalized through discharge to a certain level of from 0.5 to 0.7 V. This voltage to which the discharge equalization is to be made may be suitably chosen by changing the kind or the number of the diodes to be used.

Although even in the case of a nickel-cadmium cell, as in the case of a usual storage cell, it would be desirable to charge it, if possible, before it has discharged to a very low terminal voltage, yet it is practically tolerable for such a cell even if its terminal voltage should have dropped to zero, and it is this point that is used in the circuit shown in FIG. 4.

FIGS. 6 to 9 show an embodiment of the battery equalizing apparatus in accordance with the invention. As stated before, rapidly chargeable cells 1 are held in series in a battery cassette case 7 of plastic material, as shown in FIG. 7. The cassette case as a whole with the cells therein may be mounted on various electric devices, for use as electric power supply. The battery cassette case 7 is provided with a plus terminal hole 8 and a minus terminal hole 9, which are to receive the corresponding connection terminals of the electric devices (not shown) on which the battery cassette case is to be mounted. In the embodiment, the cassette is adapted to be placed on a discharge equalizer in order to make the residual charge in each cell zero prior to charging the battery after use, as shown in FIG. 6. The numeral 1 in FIG. 6 shows the cells held in the battery cassette case 7 shown in FIG. 7. When the battery cassette case 7 is mounted on the discharge equalizer shown in FIG. 8, each cell 1 is connected with a resistor 2 between its plus and minus terminals so that each cell 1 may discharge completely. Preferably, pilot lamps 5 may be connected in parallel to the respective resistors 2 to indicate the completion of discharge of each cell. A cooling fan motor 6 is provided to remove heat generated from resistors 2 and is driven by the voltage across the whole battery whereby, conveniently, the motor will automatically stop upon completion of discharge of the battery. The numerals 11 and 12 will be referred to later in reference to FIG. 8.

FIG. 8 shows the details of the discharge equalizer, with the resistors the exponent 2, pilot lamps 5, a cooling fan motor 6, and housing 10. The housing 10 is provided with a cassette case seat or recess, in which to mount the whole battery cassette case 7 as shown in FIG. 7. The cassette case seat is provided with engagement terminals 12 and 13, at least one of which is movable, adapted to fit into the holes 8 and 9 of the battery cassette case 7. In the Figure, the engagement terminal 12 to fit in the hole 8 is movable. By tilting a lever 14 to the right, the engagement terminal 12 is retracted and the engagement terminal 13 is brought into engagement with the hole 13. The lever 14 is then released to have the engagement terminal 12 in electrical contact with the battery's plus terminal through hole 8.

Each of the contact terminals 11, provided on the housing 10 is in electrical contact with the outer surface of each cell 1 (serving also as the minus terminal of the cell), as is clearly seen in FIG. 9. The electrical connection obtained at this time is as shown in FIG. 6, with the resistors 2 and pilot lamps 5 connected each between adjacent terminals 11 and between the contact terminal 11 and said engagement terminal 12 or 13 at either end. The cooling fan motor 6 is connected between the plus and the minus terminals of the whole battery cassette case to cool the resistors 2 until all the cells have been discharged. In order to make the cooling efficient, there are ventilation holes 17, in the housing 10 to allow for circulation of air.

With the battery cassette case placed on the discharge equalizer as above, each cell of the battery is made to completely discharge through its respective resistor 2 until its voltage becomes zero, at time each pilot lamp goes out and motor 6 stops. It is at this time that each cell 1 has lost all its residual charge. By mounting this cassette case 7 on a charger, not shown, each cell 1 may be charged equally. It is therefore possible to solve the problem encountered with the prior art where some cells having greater residual charge would be overcharged while others having less residual charge would be undercharged. It may also be expected for each cell to discharge equally while in use even if the discharge current is very big, since the charged voltage in the beginning of the discharge is equal. Moreover, even if an unbalance condition may occur temporarily, it will be corrected every time the discharge equalizer is used. Therefore no accumulation of unbalance due to repeated charging and discharging will appear as in the case of the prior art.

Although, in the embodiment described above, the seat for the cassette case 7 is shown in the form of a recess, other forms may be used for it, and although the contact terminals 11 have been described as of the type to contact the surfaces of the respective cells, it is apparent that they may be designed to contact the plus terminals of the cells. It is also possible to add a charger to the discharger in the embodiment so that the discharger and the charger may be selectively used by simply switching between them.

It is needless to say that although the foregoing embodiment has been described with reference to nickel-cadmium cells, the invention is not limited thereto but may be applicable to e.g. lead storage batteries.

We claim:

1. A discharger comprising a housing having a recess therein to receive a battery cassette holding therein a plurality of series connected cells, cassette engagement terminals, at least one of which being movably provided in said recess, a plurality of cell contact terminals each cell contact terminal contacting a single terminal from a respective one of the series connected cells held in said cassette, and self-discharge circuits formed between said terminals for permitting the discharge of the cells therethrough and for stopping the discharge of current at a predetermined voltage level which is lower than the charged voltage across each cell, inclusive of zero voltage, said self-discharge circuits each including, in series, a load circuit and a voltage controlled switch conducting above said predetermined voltage and non-conducting below said predetermined voltage, and, further comprising a fan for removing heat developed in said self-discharge circuits during discharge of cells, said fan being driven by the terminal voltage of the cassette mounted in the recess and stopping when the cells stop discharging.

* * * * *